Sept. 13, 1938.　　　F. J. DE NIRO　　　2,129,653
ENGINE STARTER
Filed Nov. 28, 1936　　　2 Sheets-Sheet 1
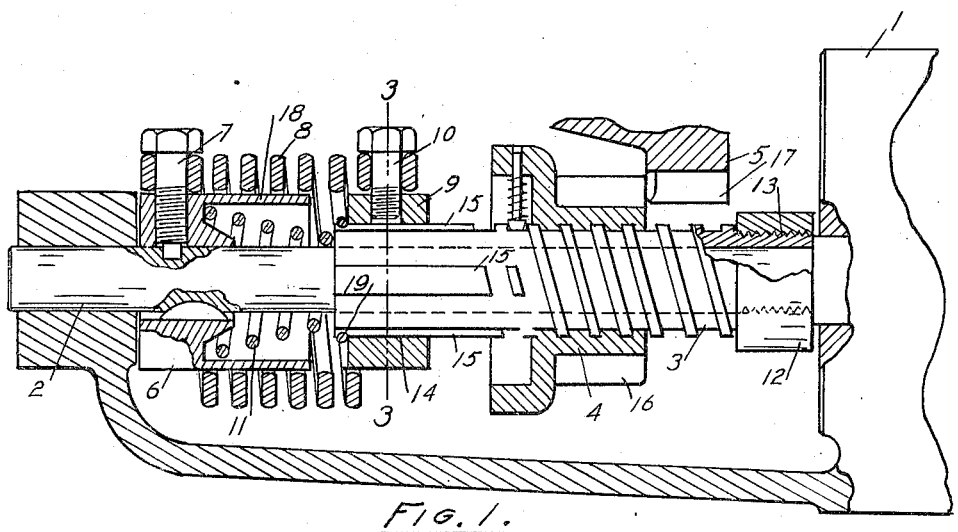
Fig. 1.
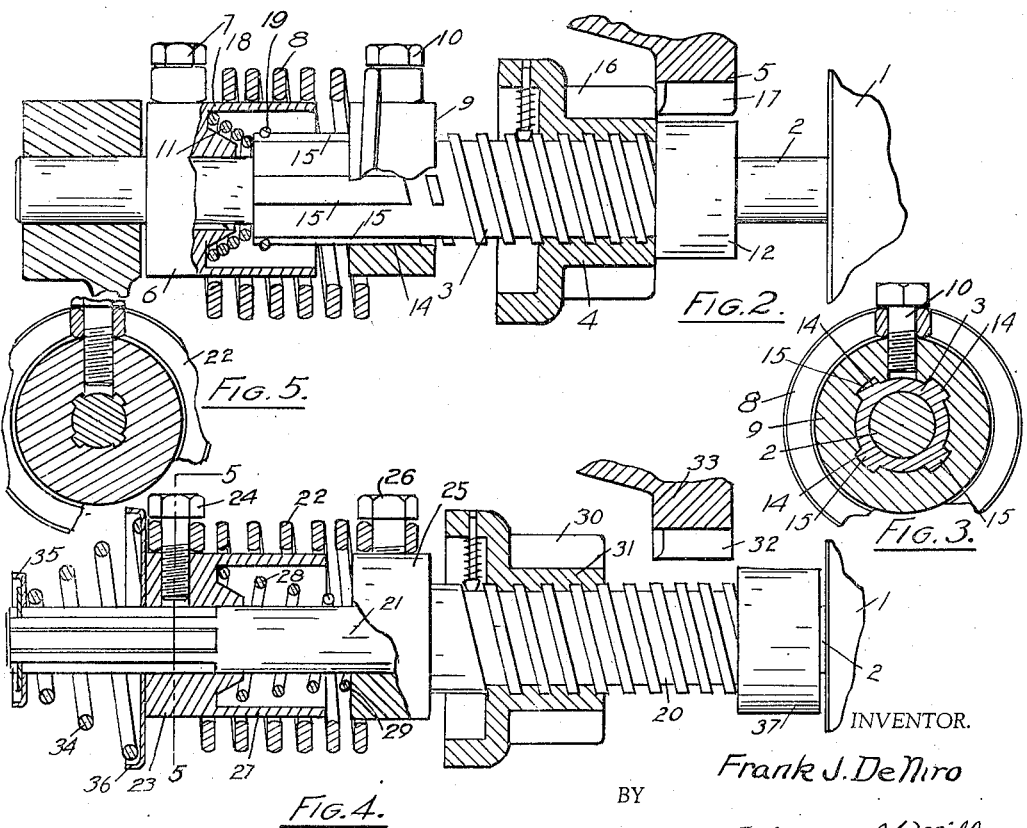
INVENTOR.
Frank J. De Niro
BY
Florian H. Miller
ATTORNEY.

Sept. 13, 1938.  F. J. DE NIRO  2,129,653

ENGINE STARTER

Filed Nov. 28, 1936  2 Sheets-Sheet 2

INVENTOR.
Frank J. De Niro
BY
ATTORNEY.

Patented Sept. 13, 1938

2,129,653

UNITED STATES PATENT OFFICE 2,129,653

ENGINE STARTER

Frank J. De Niro, Erie, Pa.

Application November 28, 1936, Serial No. 113,207

3 Claims. (Cl. 74—7)

This invention relates generally to engine starters and more particularly to a transmission or drive between the driving member and the member to be driven and started.

All devices of this character made according to the prior art and with which I am familiar, have not overcome the locking of the teeth of the driving pinion and the teeth of the ring gear on the shaft of the engine to be started when the said teeth do not mesh but meet in abutting relation. Springs of various designs have been disposed on this character of drive to take up the shock when the teeth of the driving pinion and the ring gear come in contact but none of these arrangements prevented the driving gear from being fixed against rotation when the teeth of the driving gear abutted the teeth of the ring gear. Some of these drives have had a very slight limited longitudinal movement but none of them provided a means for transmitting positive angular movement to the driving pinion when the teeth thereof came in abutting relation with the teeth of the ring gear.

It is accordingly an object of my invention to overcome the above defects and more particularly to provide a transmission or drive between the starting motor and an engine to be started wherein positive angular movement is transmitted to the driving pinion when the teeth of the driving pinion come in abutting relation with the teeth of the ring gear on a member of the engine to be started and the driving pinion becomes fixed against rotation.

Another object of my invention is to provide a transmission or drive between the driving motor and the engine to be started which is simple in construction, cheap in cost, positive in action, and easy to maintain.

Another object of my invention is to provide a transmission or drive between a driving member and a driven member to be started which is automatic in operation with automatically operated means for providing a positive angular movement to the driving pinion when it becomes fixed against rotation.

Other objects of my invention will become evident from the following detailed description, taken in conjunction with the accompanying drawings, in which Fig. 1 is a side elevational view, partly in section, of one embodiment of my invention in its normal position.

Fig. 2 is a side elevational view, partly in section, of the construction in Fig. 1 with the pinion fixed against longitudinal and rotary movement.

Fig. 3 is a view taken on the line 3—3 of Fig. 1.

Fig. 4 is a side elevational view, partly in section, of another form of my invention.

Fig. 5 is a view taken on the line 5—5 of Fig. 4.

Figure 6:
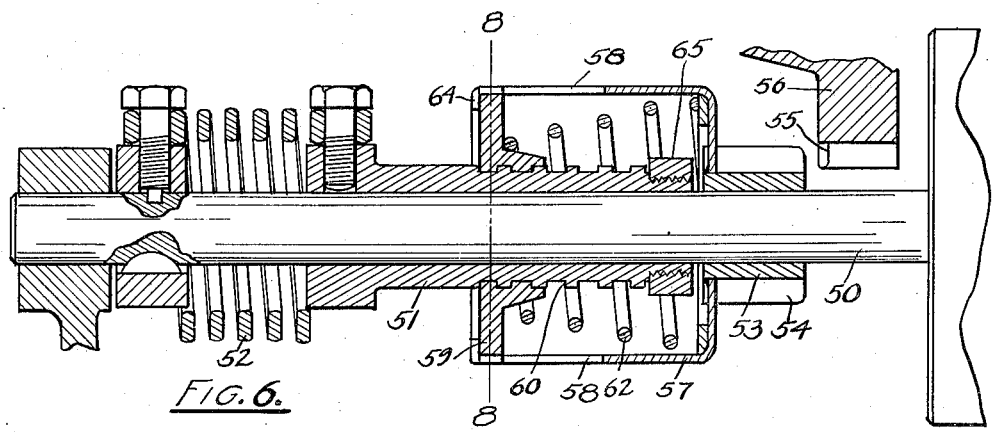
Figs. 6 and 7 are side elevational views, partly in section, of another form of my invention, one in normal position and the latter with the pinion fixed against rotary and longitudinal movement.

Referring to the drawings, Fig. 1 shows a starting motor 1 having an extending armature shaft 2 upon which is mounted the starter drive or transmission. The armature shaft 2 has a hollow screw shaft 3 telescopically mounted thereon which has a driving pinion 4 threadably engaged therewith adapted to rotate a rotatable part of an engine to be started, such as the ring gear 5 shown in Fig. 1. A collar 6 fixedly secured to the outer end of the armature shaft 2 by a set screw 7 transmits power to the screw shaft 3 through a resilient driving connection 8 and a collar 9, the resilient connection being secured to the collar 9 by means of a set screw 10. The collar 9 has grooves 14 for engaging the splines 15 on the screw shaft 3 to permit longitudinal movement thereof but no relative rotary movement between said screw shaft 3 and the collar 9. The resilient driving connection 8, in this case a coiled spring, is secured at each end thereof by the set screws 7 and 10. A nesting spring 11 surrounds the shaft 2 and is disposed between the collar 6 and the end of the screw shaft 3 to resist longitudinal movement thereof and to maintain it in its normal position as shown in Fig. 1.

A collar 12 is threadably engaged to the threaded portion 13 of the screw shaft 3 adjacent the motor 1 to transmit positive rotary movement to the pinion 4 when the pinion 4 is advanced along the shaft longitudinally, due to the rotation of the screw shaft 3 by the motor 1, adjacent the collar 12 thereby transmitting rotary movement to the ring gear 5 on the engine to be started. The collar 12 moves longitudinally with screw shaft 3 against the resistance of the spring 11 to a position adjacent the pinion 4 in order to transmit rotary movement thereto when the teeth 16 on the pinion 4 and the teeth 17 on the ring gear 5 come in abutting relation causing the pinion to be held against longitudinal or rotary movement. This position of the collar 12 is shown in Fig. 2 in which positive rotary movement is about to be transmitted to the pinion 4 by the rotating collar 12 on screw shaft 3 to cause the teeth 16 and 17 to mesh, the spring 11 providing a longitudinal force along the axis of the screw shaft 3 causing the longitudinal movement of the shaft 3 with its pinion 4 when the teeth 16 and 17 are in a position to mesh. The collar 6 has a tubular extending portion 18 to provide a guiding means for the coil spring 8 and also a means for preventing the coil spring 8 springing out of shape due to a violent snap action. The collar 9 is prevented from leaving the shaft 3 by a spring member 19.

In operation, the starting motor 1 rotates the armature shaft 2 which transmits power to the hollow screw shaft 3 through the resilient connection 8. The rotation of the screw shaft 3 causes the pinion 4 to move longitudinally to a position adjacent the collar 12 which transmits power thereto through the screw shaft 3 to rotate the intermeshing ring gear 5 on the engine to be started. It will be evident that no rotary movement is transmitted to the pinion 4 until it engages the collar 12. This fact caused all prior devices in which the collar 12 could not engage the pinion 4 to be held against rotation when the teeth of the driving pinion 4 and the ring gear 5 come into abutting relation and the driving pinion was held against longitudinal and rotary movement. When the pinion 4 is held against longitudinal and rotary movement by the abutment of its teeth 16 with the teeth 17 of the ring gear 5, the hollow screw shaft 3 continues to rotate and therefore moves relative to the pinion 4 in which it is in threadable engagement along the shaft 2 until the collar 12 arrives at a position adjacent the pinion 4 as shown in Fig. 2. In this position, positive rotary movement is transmitted from the screw shaft 3 through the collar 12 to the pinion 4 with the result that the teeth 16 of the pinion 4 are moved relative to the teeth 17 of the ring gear 5 until they are in a position to mesh whereby the spring 11 forces the hollow shaft 3 with its threadably engaged pinion 4 longitudinally to a position wherein the teeth 16 and 17 are in perfect mesh.

Fig. 4 is a modified form of the invention shown in Fig. 1. The operation is the same as the structure of Fig. 1 and all parts are the same with the exception of the means for resisting the longitudinal movement of the screw shaft 20. A driving shaft 21 has a screw shaft 20 telescopically disposed thereon and power is transmitted from the driving shaft 21 to the screw shaft 20 by a resilient connecting member 22 secured to the collar 23 by set screw 24 and to the collar 25 disposed on the screw shaft 20 by a set screw 26, the collars 23 and 25 transmitting rotary movement from the driving shaft 21 to the screw shaft 20 through the resilient member 22. The collar 23 is provided with a cylindrical extending portion 27 to provide a guiding surface for the resilient connecting member 22 and hold it in true center. A light coil spring 28 is disposed between the collar 23 and the end 29 of the screw shaft 20 to resist small forces tending to move the screw shaft 20 longitudinally such as when the teeth 30 on the pinion 31 do not come in perfect mesh with the teeth 32 on the ring gear 33 of a member of the engine to be started without having to overcome the resisting power of a heavy spring. A heavier nesting spring 34 is disposed between discs 35 and 36 to permit sufficient longitudinal movement of the screw shaft 20 when the pinion 31 is held against longitudinal and rotary movement and it is necessary that the collar 37 on the screw shaft 20 move to a position adjacent the pinion 31 in order that positive rotary movement can be transmitted to the pinion 31 from the screw shaft 20 to bring the teeth 30 of the pinion 31 in a position to be forced into meshing relation with the teeth 32 on the ring gear 33 by the springs 28 and 34.

The operation of this form of my invention is substantially the same as the drive or transmission shown in Fig. 1 with the exception that a light spring 28 is provided to compensate for slight longitudinal movements of the shaft 20 and a heavier spring 34 is provided to cooperate with the lighter spring 28 to resist the longitudinal movement of the screw shaft 20 and to force the screw shaft 20 with its engaging pinion 31 into meshing relationship with the ring gear 33 after the teeth 30 and 32 have abutted to hold the pinion against longitudinal and rotary movement and then freed by the movement of the collar 37 into engagement with the pinion to transmit rotary movement thereto.

Figure 7:
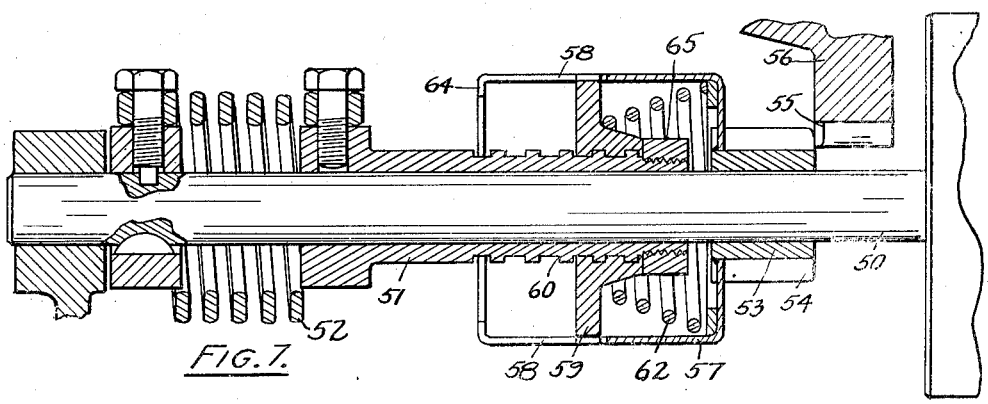
Figure 8:
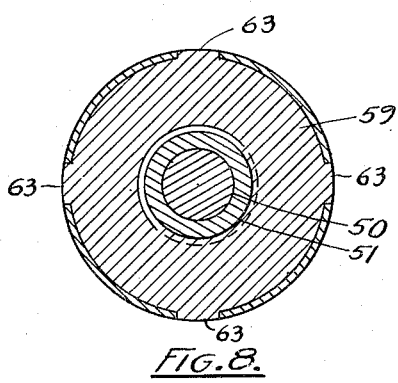
Fig. 8 is a view taken on the line 8—8 of Fig. 6.

Figs. 6 and 7 show another form of my invention in which an armature shaft 50 drives a screw shaft 51 telescopically mounted thereon and rotatable therewith through a resilient connection 52. A pinion 53 having teeth 54 adapted to engage with the teeth 55 of a ring gear 56 of an engine to be started is fixedly connected to a housing 57 having spaced longitudinal slots 58 in the outer portion thereof. A movable disc 59 is threadably engaged to the threaded portion 60 of the screw shaft 51 and moves longitudinally in the housing 57 against the force of a nesting spring 62. Splines 63 on the periphery of the disc 59 move in the slots 58 in the housing 57 thereby permitting relative longitudinal movement and no relative rotary movement between the disc 59 and the housing 57. A shoulder 64 limits the movement of the disc 59 in the housing 57. A collar 65 is disposed on the screw shaft 51 to transmit rotary movement to the driving pinion 53 through the disc 59 and housing 57 when the disc 59 moves longitudinally on the screw shaft 51.

In operation, the rotation of the screw shaft 51 causes the threaded disc 59 to move longitudinally thereon to engaging relation with the collar 65 on the screw shaft 51, the disc 59 retaining its relative position with relation to the shoulder 64 of the housing 57 in which it is normally in contact, positive rotary movement being transmitted by the collar 65 to the disc 59 and the housing 57 and pinion 53 to the ring gear 56 on the engine to be started. When the teeth 54 of the pinion 53 come in contact with the teeth 55 on the ring gear 56 and the pinion is held against rotary and longitudinal movement, the disc 59, which is threadably engaged to the threaded portion of the screw shaft 51 moves longitudinally therealong inside the housing 57 against the force of the spring 62 to a position adjacent the collar 65 whereby positive rotary movement is transmitted to the housing 57 and pinion 53 through the disc 59 thereby causing the pinion 53 to move to a position where the spring 62 will be able to move it longitudinally into meshing relation with the teeth 55 on the ring gear 56.

In the construction in Fig. 6, suitable means may be provided for limiting the movement of the screw shaft 51 relative to the armature shaft 50. Means for guiding the resilient member 52 as member 18 in Fig. 1 may also be provided in this construction.

It will be apparent that I have provided a drive or transmission for an engine starter which operates automatically to normally move into engaging relation with the ring gear or other rotary member of an engine to be started and moves out of engagement therewith when the engine is started; and which automatically releases itself when the teeth of the driving pinion and the teeth of the ring gear abut and hold the driving pinion against longitudinal and rotary movement.

Various changes may be made in the specific embodiment of the present invention without departing from the spirit thereof, or within the scope of the appended claims.

What I claim is:

1. A drive of the character described, in combination, a driving member, a driven screw shaft, a pinion threadably engaged to said screw shaft movable rotatively therewith and longitudinally therealong and adapted to engage the gear of an engine to be started, a member on said screw shaft for engagement with said pinion to transmit positive rotary movement thereto, a connection between said driving member and said screw shaft to transmit rotary movement therebetween, said screw shaft being movable longitudinally relative to said driving member, yielding means for resisting the longitudinal movement of said screw shaft relative to said driving member, and means cooperating with said yielding means and spaced a predetermined distance from one end of said screw shaft whereby said screw shaft may move a distance on said driving member at least the width of said gear on the engine to be started, said member on said screw shaft being movable longitudinally to a position adjacent said pinion when said pinion becomes locked against rotation to transmit positive rotary movement thereto.

2. A drive of the character described, in combination, a driving member, a driven screw shaft, a pinion threadably engaged to said screw shaft movable rotatively therewith and longitudinally therealong and adapted to engage the gear of an engine to be started, a member on said screw shaft for engagement with said pinion to transmit positive rotary movement thereto, a connection between said driving member and said screw shaft for transmitting rotary movement therebetween, said screw shaft being movable longitudinally relative to said driving member, yielding means for resisting the longitudinal movement of said screw shaft relative to said driving member, and means on said driving member whereby said screw shaft may move relative to said driving member until the member on said screw shaft is positioned adjacent said pinion to transmit positive rotative movement thereto when said pinion is locked against rotation.

3. In a drive of the class described, in combination, a driving member, a driven screw shaft, a pinion threadably engaged to said screw shaft movable rotatably therewith and longitudinally therealong and adapted to engage a member of an engine to be started, a collar on said screw shaft for engagement with said pinion to transmit positive rotary movement thereto, a resilient connection between said driving member and said screw shaft to transmit rotary movement therebetween and permit longitudinal movement of said screw shaft, yielding means for resisting the longitudinal movement of said screw shaft on said driving member, said collar being movable longitudinally with the screw shaft a sufficient distance when said pinion becomes locked against rotation to transmit positive angular force to said pinion in order that it may transmit rotary movement to the member of the engine to be started, and means cooperating with said yielding means whereby said screw shaft may move a sufficient distance on said driving member for said collar to move adjacent said pinion to transmit positive rotary movement thereto.

FRANK J. DE NIRO.